(12) United States Patent
Douglas et al.

(10) Patent No.: US 11,285,481 B2
(45) Date of Patent: Mar. 29, 2022

(54) FLUID FLOW CONTROLLER FOR MICROFLUIDIC DEVICES

(71) Applicant: Fluidic Analytics Limited, Cambridge (GB)

(72) Inventors: Anthony Douglas, Cambridge (GB); Tuomas Pertti Jonathan Knowles, Cambridge (GB); Thomas Mueller, Oberengstringen (CH); Andrew Lynn, Cambridge (GB)

(73) Assignee: Fluidic Analytics Limited, Cambridge (GB)

( * ) Notice: Subject to any disclaimer, the term of this patent is extended or adjusted under 35 U.S.C. 154(b) by 264 days.

(21) Appl. No.: 16/329,292

(22) PCT Filed: Sep. 1, 2017

(86) PCT No.: PCT/GB2017/052552
§ 371 (c)(1),
(2) Date: Feb. 28, 2019

(87) PCT Pub. No.: WO2018/042190
PCT Pub. Date: Mar. 8, 2018

(65) Prior Publication Data
US 2019/0247855 A1 Aug. 15, 2019

(30) Foreign Application Priority Data

Sep. 2, 2016 (GB) .................................... 1614904

(51) Int. Cl.
*B01L 3/00* (2006.01)
*B01J 19/00* (2006.01)

(52) U.S. Cl.
CPC ..... *B01L 3/502746* (2013.01); *B01J 19/0093* (2013.01); *B01L 3/502715* (2013.01);
(Continued)

(58) Field of Classification Search
CPC ......... B01L 3/502746; B01L 3/502715; B01L 2200/027; B01L 2300/0867;
(Continued)

(56) References Cited

U.S. PATENT DOCUMENTS 6,495,366 B1 12/2002 Briggs
6,637,463 B1 * 10/2003 Lei ........................ B01F 5/0403
137/803

(Continued)

FOREIGN PATENT DOCUMENTS

WO WO 2008/062708 A1 5/2008
WO WO 2017/141048 A1 8/2017
(Continued)

OTHER PUBLICATIONS

Search Report for App. No. GB 1614904.9 dated Feb. 17, 2017. 5 pages.
(Continued)

*Primary Examiner* — Jennifer Wecker
*Assistant Examiner* — Oyeleye Alexander Alabi
(74) *Attorney, Agent, or Firm* — Wolf, Greenfield & Sacks, P.C.

(57) ABSTRACT

A fluid flow controller for introducing fluids into a microfluidic device is provided. The fluid flow controller comprising, at least one high resistance fluid pathway provided between an inlet port and a connection port; at least one low resistance fluid pathway between the inlet and connection port; and at least one valve configured to enable fluid flow through the high resistance fluid pathway, the low resistance fluid pathway or both.

9 Claims, 3 Drawing Sheets

(52) U.S. Cl.
CPC .......... *B01J 2219/0086* (2013.01); *B01J 2219/00896* (2013.01); *B01L 2200/027* (2013.01); *B01L 2300/0867* (2013.01); *B01L 2400/0487* (2013.01); *B01L 2400/0633* (2013.01)

(58) Field of Classification Search
CPC ...... B01L 2400/0487; B01L 2400/0633; B01J 19/0093; B01J 2219/0086
See application file for complete search history.

(56) References Cited

U.S. PATENT DOCUMENTS

| | | | |
|---|---|---|---|
| 6,880,576 B2 | 4/2005 | Karp et al. | |
| 6,919,046 B2 | 7/2005 | O'Connor et al. | |
| 8,153,083 B2 | 4/2012 | Briggs | |
| 9,952,222 B2 | 4/2018 | Yates et al. | |
| 9,958,369 B2 | 5/2018 | Cohen et al. | |
| 2008/0112850 A1 | 5/2008 | Higashino et al. | |
| 2009/0008253 A1 | 1/2009 | Gilbert et al. | |
| 2010/0186840 A1 | 7/2010 | Kartalov et al. | |
| 2012/0040472 A1* | 2/2012 | Churski | B01F 5/0646 436/180 |
| 2017/0052147 A1 | 2/2017 | Herling et al. | |
| 2018/0188145 A1 | 7/2018 | Mueller et al. | |
| 2018/0267054 A1 | 9/2018 | Yates et al. | |
| 2018/0328831 A1 | 11/2018 | Cohen et al. | |

FOREIGN PATENT DOCUMENTS

| | | |
|---|---|---|
| WO | WO 2017/174975 A1 | 10/2017 |
| WO | WO 2018/002596 A1 | 1/2018 |
| WO | WO 2018/046952 A1 | 3/2018 |
| WO | WO 2018/046953 A1 | 3/2018 |
| WO | WO 2018/046954 A1 | 3/2018 |

OTHER PUBLICATIONS

International Search Report and Written Opinion for PCT/GB2017/052552 dated Nov. 2, 2017. 13 pages.

* cited by examiner

FLUID FLOW CONTROLLER FOR MICROFLUIDIC DEVICES

RELATED APPLICATIONS

This application is a national stage filing under 35 U.S.C. § 371 of international application number PCT/GB2017/052552, filed Sep. 1, 2017, which claims priority to GB application number GB1614904.9, filed Sep. 2, 2016, each of which is herein incorporated by reference in its entirety.

This invention relates to improvements in or relating to a fluid flow controller and in particular, a fluid flow controller for controlling the flow of a fluid into a microfluidic device.

Microfluidic devices offer many desirable capabilities for example, the ability to use very small quantities of biological or chemical samples and reagents such as proteins, carbohydrates or DNA. In addition, microfluidic devices also have the ability to analyse, separate and detect fluids contained within the samples or reagents with high resolution and sensitivity.

Fluid handling, pumping and manipulation often play a critical role in introducing fluids into the microfluidic devices. In most microfluidic devices, a fluid flow can be manipulated by external means such as applying pressure to the fluid pathways or using a flow pump.

Pressure can be accurately and precisely controlled in microfluidic devices with the use of pressure actuators. However, controlling the flow rates in microfluidic devices can often be a challenge. This problem can be exacerbated when using inexpensive microfluidic chips.

Controlling the flow rates of fluids in a microfluidic device may be achieved with the use of a flow pump. However, a flow pump typically has a slow response to changes in the desired fluid flow. For example, it can take several minutes for changes in the flow rates to occur within the microfluidic device.

In addition, controlling the flow of fluids may include applying pressure over a large resistance in the fluid pathways. However, this can often be a time-consuming process as the large resistance may decrease the flow rate of fluids through the channel.

It is against this background that the invention has arisen.

According to the present invention there is provided, a fluid flow controller for introducing fluids into a microfluidic device, the controller comprising: at least one high resistance fluid pathway provided between an inlet port and a connection port; at least one low resistance fluid pathway between the inlet and connection port; and at least one valve configured to enable fluid flow through the high resistance fluid pathway, the low resistance fluid pathway or both or none.

The fluid flow controller, which can be used for introducing fluids into a microfluidic device, is particularly advantageous as it may provide a means for controlling the flow of fluids through one or more high resistance fluid pathways and/or one or more low resistance fluid pathways.

In normal operation the fluids flow through the high resistance pathways. However, if it is desired to bypass the device, then access can be enabled to the low resistance fluid pathway. This allows the fluid that would otherwise have flowed through the high resistance fluid pathway to flow instead through the bypass or low resistance fluid pathway.

In some embodiments, when access is enabled to the low resistance fluid pathway, the high resistance fluid pathways are closed off. This configuration ensures that all of the fluid bypasses the high resistance pathways completely.

In some embodiments, when access is enabled to the low resistance fluid pathway, the high resistance fluid pathways remain accessible, but as a result of the difference in resistance fluid will preferentially flow through the low resistance fluid pathway. However, a small proportion of the fluid will flow through the high resistance fluid pathway thus ensuring that the same fluid is flowing through all pathways and ensuring that no bubbles of air enter any part of the device.

The resistance of the high and low resistance fluid pathway may be dictated by one or more of the following: the cross sectional area of the pathway, the length of the pathway and the surface roughness of the pathway, as well as the viscosity of the fluid. In some embodiments, the cross sectional area of the low resistance pathway may be 0.1 mm to 2 mm, and the length of the low resistance pathway may be between 1 and 1000 mm, for example 100 mm in length.

In some embodiments, there is provided a network of interlinked high resistance fluid pathways one or more inlet ports to one or more connection ports.

In some embodiments, each high resistance fluid pathway has a corresponding low resistance fluid pathway. This embodiment is particularly useful where different high resistance pathways are carrying different fluids and each of those high resistance pathways may need to be bypassed. The provision of a separate low resistance pathway for each high resistance pathway means that all of the high resistance pathways can be bypassed without the fluids mixing in the low resistance pathways.

A plurality of high resistance fluid pathways and a plurality of low resistance fluid pathways may be provided in an array. A plurality of high resistance fluid pathways and a plurality of low resistance fluid pathways can be advantageous to connect to a microfluidic chip as it can be used to control the flow rates of several fluids.

The controller may further comprise a manifold including a plurality of valves for controlling the array of fluid pathways. In the context of microfluidic devices, valves are advantageous in that they may enable the microfluidic device to be used for performing complex fluid handling procedures. For example, the valves could be used to control the direction of fluids that flow through the array of fluid pathways.

The plurality of valves is particularly advantageous because it can be used to enable the fluids to partially or completely bypass one or more fluid pathways. In some embodiments, the valve may be opened to permit the fluids to flow through the low resistance fluid pathways, thereby enabling the fluids to partially or completely bypass the high resistance fluid pathways. In some embodiments, the valve may be closed, enabling the fluids to flow along the high resistance fluid pathway only. In other embodiments, the valve may be provided on the low resistance fluid pathway to permit the flow of fluids through both the high and low resistance fluid pathways.

The resistance of the low resistance fluid pathway can be several orders of magnitude smaller than the resistance of the chip, for example up to 100000 times smaller. The resistance of the high resistance fluid pathway can be several orders of magnitude larger than the chip resistance, for example between 3 and 3000 times larger.

For example, the low resistance fluid pathway may have a resistance 1000 times smaller than the chip resistance and the high resistance fluid pathway may have a resistance 100 times larger than the chip resistance.

The high resistance fluid pathway may have a resistance of between 1 mbar/µl/h and 1000 mbar/µl/h. The low resistance fluid pathway may have a resistance in the range of $1\times10^{-5}$ mbar/µl/hr and 100 mbar/µl/hr.

The use of bypasses is particularly appropriate for systems deploying low precision chips so that the high resistance fluid pathway can be used for flow control.

The resistance of the low resistance fluid pathway can be 1 to 10,000,000 times less than the resistance of the high resistance fluid pathway In some embodiments, the high resistance fluid pathway may have a resistance of 1 mbar/µl/h to 1000 mbar/µl/h, or it may exceed 100, 200, 400, 800 or 1000 mbar/µl/h. In some embodiments, the high resistance fluid pathway may have a resistance of less than 1000, 800, 400, 200, 100 or 50 mbar/µl/h. Preferably, the high resistance fluid pathway has a resistance of 10 mbar/µl/h.

In some embodiments, the low resistance fluid pathway may have a resistance of 0.00001 mbar/µl/h to 100 mbar/µl/h, or it may exceed 0.0001, 0.001, 0.01, 0.1, 1, 10 or 100 mbar/µl/h. In some embodiments, the low resistance fluid pathway may have a resistance less than 100, 50, 10, 1, 0.1, 0.01, 0.001 or 0.0001 mbar/µl/h. Preferably, the low resistance fluid pathway has a resistance of 0.001 mbar/µl/h.

The valve may be configured to close the low resistance fluid pathway only. By closing the low resistance fluid pathway only, it may provide a means to prevent one or more fluids flowing through the low resistance fluid pathway and/or, it may direct one or more fluids to flow from the low resistance fluid pathway to the high resistance fluid pathway.

Preferably, the fluid flow controller disclosed in the present invention is provided as an interface to a microfluidic chip.

The invention will now be further and more particularly described, by way of example only, and with reference to the accompanying drawings, in which.

Figure 1A:
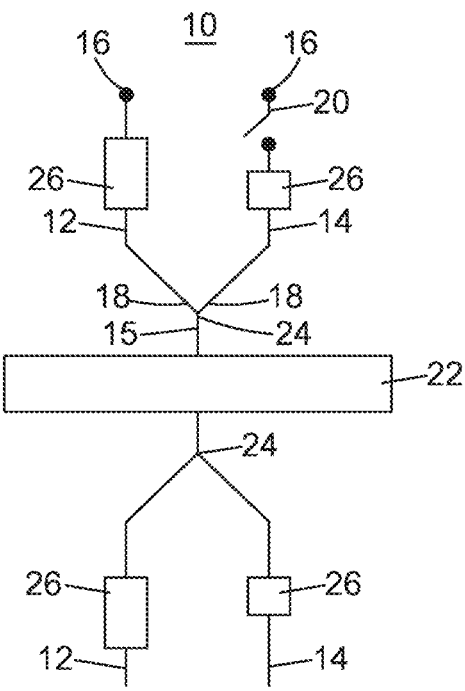
FIG. 1A shows a fluid flow controller according to the present invention applied to a microfluidic chip with a closed valve on a low resistance fluid pathway.

Referring to FIG. 1A, there is shown a fluid flow controller 10 used for introducing fluids into a microfluidic device 22. The fluid flow controller 10 comprises at least one high resistance fluid pathway 12 provided between an inlet port 16 and a connection port 18 which provides an outlet from the flow controller together with connection into the microfluidic device 22.

The fluid flow controller also comprises at least one low resistance fluid pathway 14 between the inlet port 16 and connection port 18; and at least one valve 20 configured to enable a fluid flow through the high resistance fluid pathway 12, the low resistance fluid pathway 14 or both. Each high resistance fluid pathway has a corresponding low resistance fluid pathway in order to enable the fluids to flow to the same inlet port or connection port.

Figure 1B:
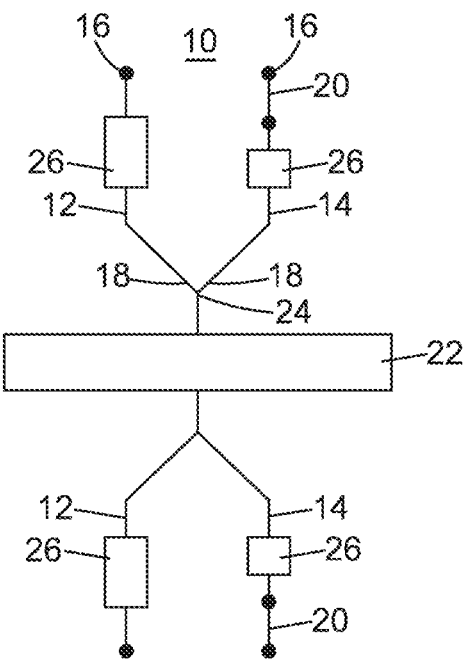
FIG. 1B shows the fluid flow controller according to FIG. 1A, applied to the microfluidic chip with a open valve on the low resistance fluid pathway.
Figure 2:
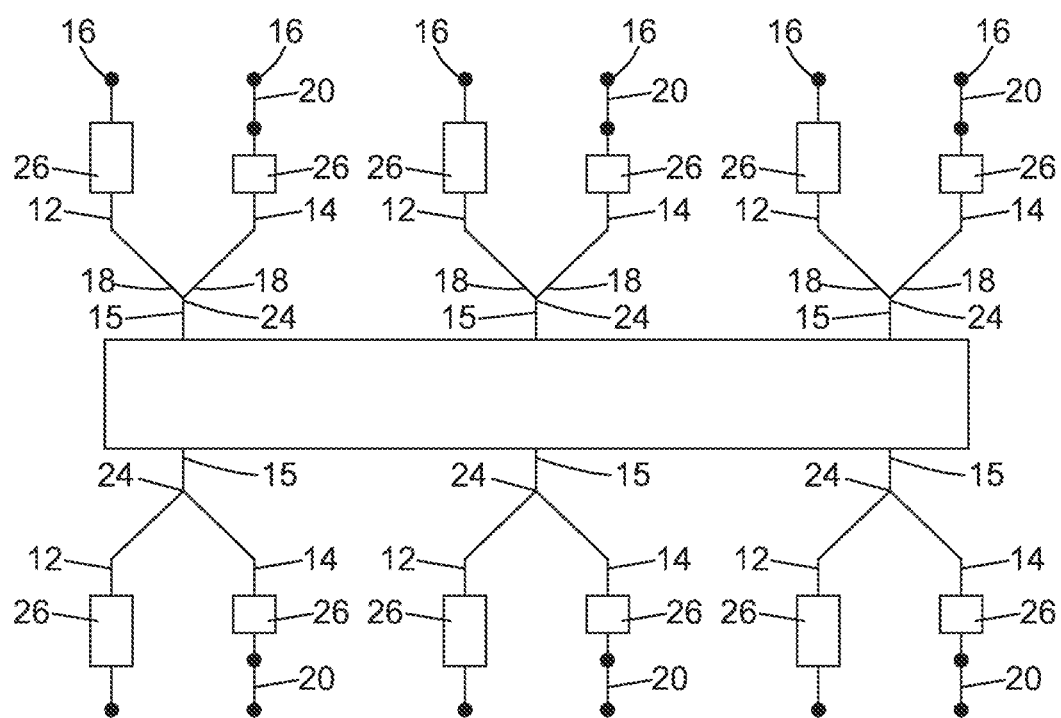
FIG. 2 shows a plurality of fluid pathways according to FIGS. 1A and 1B being applied to the microfluidic chip.

The microfluidic chip 22 as illustrated in FIGS. 1A, 1B and 2 is configured to combine one or more high resistance fluid pathways 12 and one or more low resistance fluid pathways 14 at one or more combination junctions 24. The combination junction 24 is situated at the end of at least one inlet port 16 or at least one connection port 18 of the fluid pathways as shown in FIGS. 1A, 1B and 2. The combination junction 24 provides a means for combining the high resistance fluid pathways 12 and the low resistance fluid pathways 14.

In some embodiments, the configuration downstream of the chip 22 may differ from the illustrated embodiments. For example, there may be no combination junction 24. In some embodiments, there may be more than one combination junction 24. In particular, there may be several low resistance fluid pathways and valves 20 in parallel. It should be apparent, therefore, that the number of connection ports 18 does not need to match the number of inlet ports 16.

In some embodiments, the combined fluids from the high resistance fluid pathway 12 and the low resistance fluid pathway 14 continues to flow along a further fluid pathway 15 towards the microfluidic chip as illustrated in FIGS. 1A, 1B and 2.

The valve 20 is provided on the low resistance fluid pathway. When in use, the valve is opened to enable the fluid to flow preferentially along the low resistance fluid pathway 14 and towards the microfluidic chip 22, as illustrated in FIG. 1A. In some instances, the opening of the valve can enable the fluid to flow along both the high resistance fluid pathway and the low resistance fluid pathway. Therefore, when in use, the valve 20 is configured to enable a fluid flow to partially or completely bypass the high resistance fluid pathway 12. In this context, a partial bypass will be effected by enabling access to the low resistance fluid pathway, but not actively blocking the high resistance fluid pathway. Under these circumstances, the relative flow rates through the pathways will be related to the relative resistance of the pathways. As a result, there will be very little flow through the high resistance pathway as soon as access is enabled to the low resistance pathway.

The flow rate of the fluids through the high resistance fluid pathway can often be slow and as a result, the time taken for a volume to pass through the microfluidic device can take minutes to hours. This can often be a time-consuming process. In contrast, the time taken for fluids to flow along the low resistance fluid pathway is significantly reduced, typically taking seconds to minutes for the fluids to flow along the low resistance fluid pathway and into the microfluidic chip. This may be desirable in situations where for instance, a fast flow rate of a fluid is required to remove air bubbles quickly from the microfluidic chip.

Referring to FIG. 1B, there is shown a closed valve 20 on the low resistance fluid pathway 14. The closed valve is configured to partially or completely obstruct the flow of the fluids along the low resistance fluid pathway. As a result, the fluids are forced to flow along the high resistance fluid pathway towards the microfluidic chip.

In some embodiments, there can be several low resistance pathways provided in parallel, with a valve at each low resistance pathway, wherein the device is configured so that each of the low resistance pathways introduces a different fluid.

Figure 3A:
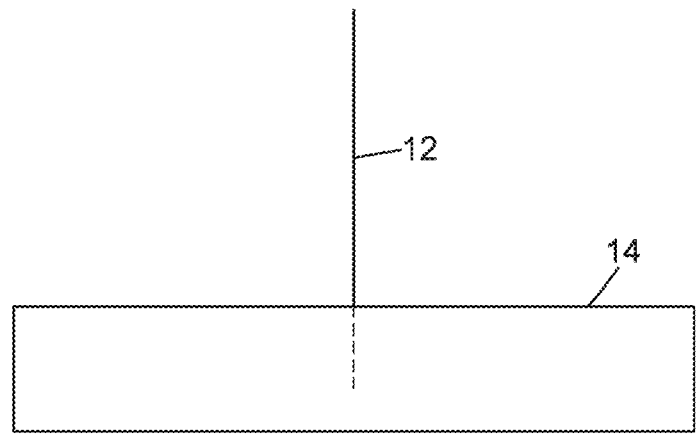
FIG. 3A shows a side view of the fluid flow controller of the present invention.
Figure 3B:
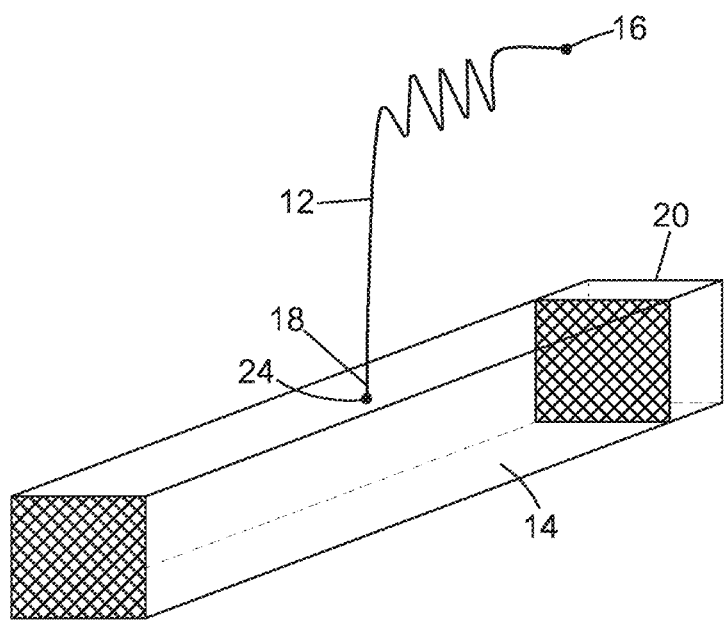
FIG. 3B shows a perspective view of the fluid flow controller.

As shown in FIGS. 3A and 3B, the combination junction 24 may have a small swept volume and virtually a zero dead volume. As disclosed herein, and unless otherwise stated, the term "dead volume" refers to a portion of the internal fluids that is out of a flow path for example, and the term "swept volume" refers to the additional volume the valve provides compared to the bare, valve-free fluid pathway. The dead volume of the combination junction 24 is substantially zero, and the total swept volume is only the volume of the pathway itself. Therefore, the combination junction can be considered to have substantially zero swept volume.

Referring to FIG. 2, there is shown a plurality of high resistance fluid pathways 12 and low resistance fluid pathways 14 in an array. The high resistance fluid pathways 12 and low resistance fluid pathways 14 are applied to the microfluidic chip 22, as shown in FIG. 2, in order to introduce a plurality of fluids into the chip. Furthermore, the plurality of high resistance fluid pathways 12 and low resistance fluid pathways 14 may allow for a separation or analysis of biological components, such as proteins or nucleic acids, in the fluid flows.

As illustrated in FIG. 2, the valve 20 is opened to enable the fluids to flow along the low resistance fluid pathways 12 in an array. As a result, the fluids partially or completely bypass the high resistance fluid pathways 14 within the array. The flow rate in each of the low resistance fluid pathways will be greater than the flow rate in each of the high resistance fluid pathways.

The resistances 26 of the high resistance fluid pathways 12 and the low resistance fluid pathways 14, as illustrated in FIGS. 1A, 1B, 2, 3A and 3B are provided in order to control the flow of the fluids along the fluid pathways. In particular, a combination of resistances 26 within the high resistance fluid pathways and the low resistance fluid pathways are used to control a flow rate within the high resistance fluid pathways 12, the low resistance fluid pathways 14 or both. The combination of resistances 26 of the high resistance fluid pathways 12 and the low resistance fluid pathways 14 may also be used to control the overall flow rates. Furthermore, in configurations including more than one valve 20, the valves can be switched at different times in order to increase control over the flow of fluids. Controlling the flow rate can be particularly valuable for performing and controlling biological or chemical reactions, or for separating and analysing components in a fluid for example.

Referring to FIGS. 3A and 3B, the low resistance fluid pathway has a rectangular cross section, which may have a diameter of between 0.1 mm to 10 mm. The length of the low resistance fluid pathway may be between 1 mm and 1000 mm. The diameter of the high resistance fluid pathway may be between 0.001 mm and 0.5 mm and its length may be within the range of 1 to 2500 mm. An example of a fluid pathway may be a capillary pathway or a tubing pathway. Alternatively, the fluid pathways may have a circular, a D-shaped or a square cross section.

As shown in FIGS. 3A and 3B, the connection port 18 of the high resistance fluid pathway is connected to the low resistance fluid pathway at a combination junction 24. The flow of the fluids along the fluid pathways can be dictated by the resistances of the fluid pathways.

The value of the resistance 26 of the high resistance fluid pathway 12 is provided by the geometry of the high resistance fluid pathway. The value of the resistance 26 of the low resistance fluid pathway 14 is provided by the geometry of the low resistance fluid pathway.

As an example, the resistance 26 of the high resistance fluid pathway and the low resistance fluid pathway can be dictated by one or more of the following: the cross sectional area of the pathway, the length of the pathway and the surface roughness of the pathway. In some embodiments, the resistance of the low resistance fluid pathway with a 1 mm diameter and 100 mm in length is 0.00001 mbar/($\mu$l/h).

The resistance of the low resistance fluid pathway can be 3 times less than the resistance of the high resistance fluid pathway. Alternatively, the resistance of the low resistance fluid pathway can be at least 10 times less than the resistance of the high resistance fluid pathway. The high resistance fluid pathway has a resistance of 10 mbar/$\mu$l/h, which is large in comparison to the resistance of 0.001 mbar/$\mu$l/h provided at the low resistance fluid pathway.

The fluid flow controller 10 may further comprise a manifold including a plurality of valves for controlling the array of fluid pathways.

It will be appreciated that the number of high resistance fluid pathways and low resistance fluid pathways within a microfluidic chip may vary substantially. The resistances of the high resistance fluid pathways and low resistance fluid pathways allow for accurate and controlled flow rates in the microfluidic chips. The valves on the low resistance fluid pathways are configured to, when in use, permit one or more fluid flows to bypass the high resistance fluid pathways.

It will further be appreciated by those skilled in the art that although the invention has been described by way of example with reference to several embodiments. It is not limited to the disclosed embodiments and that alternative embodiments could be constructed without departing from the scope of the invention as defined in the appended claims.

The invention claimed is:

1. A fluid flow controller for introducing fluids into a microfluidic device, the controller comprising:
a first resistance fluid pathway provided between an inlet port to the fluid controller and a connection port to the microfluidic device;
a second resistance fluid pathway between the inlet port and the connection port;
wherein the resistance of the second resistance fluid pathway is at least 10 times less than the resistance of the first resistance fluid pathway; and wherein the controller further comprises at least one valve configured to close the second resistance fluid pathway only.

2. The controller according to claim 1, wherein the resistance of the first resistance and second resistance fluid pathways are determined by one or more of the following: the cross sectional area of the pathway, the length of the pathway and the surface roughness of the pathway.

3. The controller according to claim 1, wherein the first resistance fluid pathway is one pathway within a network of pathways linking one or more inlet ports to one or more connection ports.

4. The controller according to claim 3, wherein each first resistance fluid pathway has a corresponding second resistance fluid pathway.

5. The controller according to claim 1, wherein a plurality of first resistance fluid pathways and a plurality of second resistance fluid pathways are provided in an array.

6. The controller according to claim 5, further comprising a manifold including a plurality of valves for controlling the array of fluid pathways.

7. The controller according to claim 1, wherein the first resistance fluid pathway has a resistance of between 1 mbar/$\mu$l/h and 1000 mbar/$\mu$l/h.

8. The controller according to claim 1, wherein the second resistance fluid pathway has a resistance in the range of $1\times10^{-5}$ mbar/$\mu$l/hr and 100 mbar/$\mu$l/hr.

9. The controller according to claim 1, provided as an interface to a chip.

* * * * *